(12) United States Patent
Pavlyushchik

(10) Patent No.: US 10,691,800 B2
(45) Date of Patent: Jun. 23, 2020

(54) SYSTEM AND METHOD FOR DETECTION OF MALICIOUS CODE IN THE ADDRESS SPACE OF PROCESSES

(71) Applicant: AO Kaspersky Lab, Moscow (RU)

(72) Inventor: Mikhail A. Pavlyushchik, Moscow (RU)

(73) Assignee: AO Kaspersky Lab, Moscow (RU)

( * ) Notice: Subject to any disclaimer, the term of this patent is extended or adjusted under 35 U.S.C. 154(b) by 263 days.

(21) Appl. No.: 15/925,920

(22) Filed: Mar. 20, 2018

(65) Prior Publication Data

US 2019/0102552 A1 Apr. 4, 2019

Related U.S. Application Data

(60) Provisional application No. 62/574,239, filed on Oct. 19, 2017.

(30) Foreign Application Priority Data

Sep. 29, 2017 (RU) ................................ 2017133837

(51) Int. Cl.
| | | |
|---|---|---|
| *G06F 21/00* | (2013.01) | |
| *G06F 21/56* | (2013.01) | |
| *G06F 21/52* | (2013.01) | |

(52) U.S. Cl.
CPC ............ *G06F 21/566* (2013.01); *G06F 21/52* (2013.01); *G06F 21/568* (2013.01); *G06F 2221/033* (2013.01)

(58) Field of Classification Search
CPC ....... G06F 21/566; G06F 21/52; G06F 21/568; G06F 2221/033
See application file for complete search history.

(56) References Cited

U.S. PATENT DOCUMENTS

| | | | | |
|---|---|---|---|---|
| 8,205,257 | B1* | 6/2012 | Satish | ................. H04L 63/1416 726/22 |
| 8,612,995 | B1* | 12/2013 | Yun | ........................ G06F 13/00 719/313 |
| 9,111,096 | B2* | 8/2015 | Pintiysky | ............. G06F 21/566 |

(Continued)

FOREIGN PATENT DOCUMENTS

WO 2016056120 A1 2/2016

*Primary Examiner* — John B King
(74) *Attorney, Agent, or Firm* — Arent Fox LLP; Michael Fainberg

(57) ABSTRACT

Disclosed are methods and systems for detecting malicious codes in the address space of processes. The described method detects a launching of a process from an executable file executing on a computer, detects access to a address within a memory area in an address space of the trusted process, wherein the memory area is a memory area that lies outside the boundaries of the trusted executable image representing the executable file and is an executable memory area, analyzes memory areas within a vicinity of the address space to determine whether another executable image is located in the memory areas, analyzing the another executable image to determine whether the other executable image contains malicious code, concluding malicious code is contained in the address space of the trusted process when the another executable image contains malicious code and performing one of removing, halting or quaranting the malicious code from the address space.

21 Claims, 3 Drawing Sheets

(56) References Cited

U.S. PATENT DOCUMENTS

| | | | |
|---|---|---|---|
| 9,407,648 B1* | 8/2016 | Pavlyushchik | G06F 9/544 |
| 9,411,953 B1 | 8/2016 | Kane et al. | |
| 10,101,738 B2* | 10/2018 | Kaspersky | G05D 1/0016 |
| 10,474,813 B1* | 11/2019 | Ismael | H04L 63/145 |
| 10,545,496 B2* | 1/2020 | Kaspersky | H04W 12/08 |
| 2005/0010804 A1* | 1/2005 | Bruening | G06F 21/52 |
| | | | 726/1 |
| 2009/0028135 A1* | 1/2009 | Mantripragada | H04L 12/66 |
| | | | 370/352 |
| 2009/0077664 A1* | 3/2009 | Hsu | G06F 21/566 |
| | | | 726/24 |
| 2009/0199297 A1* | 8/2009 | Jarrett | G06F 21/566 |
| | | | 726/24 |
| 2013/0152200 A1 | 6/2013 | Alme et al. | |
| 2013/0290662 A1 | 10/2013 | Teal | |
| 2014/0237596 A1* | 8/2014 | Grytsan | G06F 21/566 |
| | | | 726/23 |
| 2014/0325650 A1 | 10/2014 | Pavlyushchik | |
| 2015/0143374 A1* | 5/2015 | Banga | G06F 21/00 |
| | | | 718/1 |
| 2015/0163231 A1* | 6/2015 | Sobko | H04L 63/145 |
| | | | 726/24 |
| 2015/0215335 A1 | 7/2015 | Giuliani et al. | |
| 2015/0371039 A1 | 12/2015 | Suominen | |
| 2016/0232347 A1 | 8/2016 | Badishi | |
| 2017/0032118 A1 | 2/2017 | Carson | |
| 2017/0039371 A1* | 2/2017 | Lukacs | G06F 3/0653 |
| 2017/0124327 A1* | 5/2017 | Kumbhar | G06F 21/566 |
| 2018/0189508 A1* | 7/2018 | Li | G06F 21/6218 |
| 2019/0005236 A1* | 1/2019 | Singh | G06F 21/566 |

\* cited by examiner

SYSTEM AND METHOD FOR DETECTION OF MALICIOUS CODE IN THE ADDRESS SPACE OF PROCESSES

CROSS-REFERENCE TO RELATED APPLICATION

This application claims benefit of priority under 35 U.S.C. 119(a)-(d) to a Russian Patent Application No. 2017133837 filed on Sep. 29, 2017, and the benefit of priority under 35 U.S.C. 119(e) to U.S. Provisional Patent Application No. 62/574,239, which was filed on Oct. 19, 2017, both of which are incorporated herein by reference in their entirety.

FIELD OF TECHNOLOGY

The present disclosure generally relates to the field of computer security, and more specifically, to systems and methods for detection of malicious code in the address space of processes.

BACKGROUND

Software for detecting malicious code and malicious files, such as antivirus applications are constantly being improved. Oftentimes such software work together with modules (or include such modules) for application control to enhance the quality of security provided to computer systems by, for example, preventing the running of untrusted applications. Application control modules generally use white lists and black lists of applications to identify which applications are permitted and which are prohibited. Files or applications from a black list are recognized by the antivirus application as being malicious, while files from a white list are considered to be safe for computer systems ("trusted") and are not further checked by the antivirus application. The use of such lists significantly reduces the load on the computer system in providing security by an antivirus application, since the antivirus application does not need to check each file by all available methods, including: with the aid of signature analysis, heuristic analysis, behavioral analysis, and so forth.

However, not all of the actions or processes launched from a trusted file contained in a white list are harmless to a computer system. Modern malicious programs may embed themselves in the address space of trusted processes and execute their malicious code from the address space of a trusted process. The execution of such a malicious code is not detected (and thus not blocked) by the antivirus application, since no analysis (for example, signature or heuristic analysis) is performed by the antivirus application in regard to code from the address space of a trusted process.

However, approaches to the detection of memory regions in the address space of processes which correspond to malicious code require sizeable computing resources, since such approaches involve scanning of the memory of a computer system. The present disclosure provides aspects which address the problem of detecting malicious code in the address space of a process more effectively.

SUMMARY

Accordingly, a system and method is disclosed herein for improving comuter security, and more particularly for detection of malicious code in the address space of processes.

According to one aspect, the disclosure provides a method for detecting malicious code in an address space of a process comprising detecting a launching of a trusted process from a trusted executable file executing on a computer system, detecting access to a suspicious address within a suspicious memory area in an address space of the trusted process, wherein the suspicious memory area is a memory area that lies outside the boundaries of the trusted executable image representing the trusted executable file and is an executable memory area, analyzing one or more memory areas within a vicinity of the suspicious address space in the computer system to determine whether another executable image representing another executable file is located in the one or more memory areas, analyzing the another executable image to determine whether the another executable image contains malicious code, concluding malicious code is contained in the address space of the trusted process when the another executable image contains malicious code and performing one of removing, halting or quaranting the malicious code from the address space of the trusted process.

According to another exemplary aspect, the method includes wherein detecting the launching comprises, intercepting a function that launches the process, determining identifying information for the process and determining and accessing the address space associated with suspicious acitivity based on the identifying information.

According to another exemplary aspect, the method includes concluding the one or more memory areas to be suspicious when the one or more memory areas do not contain trusted areas.

According to another exemplary aspect, the method includes wherein the trusted areas comprise one or more of a vicinity of the executable image in the address space, a vicinity of an image of a known executable file and a vicinity of a known address in the address space.

According to another exemplary aspect, the method includes wherein the vicinity is within a first predetermined number of bytes from a starting address of the executable image and a second predetermined number of bytes from an end address of the executable image.

According to another exemplary aspect, the method includes determining boundaries of a vicinity of the executable image by querying for page information regarding the memory areas.

According to another exemplary aspect, the method includes detecting whether a memory address in the address space is present in a memory area reserved for a stack of the trusted process.

According to another exemplary aspect, the method includes searching for an address on the stack using a function call to access information regarding a thread on which the process is executing.

According to another exemplary aspect, the method includes establishing a callback procedure for calling each of the one or more functions.

According to another exemplary aspect, a system is provided for detecting malicious code comprising a malicious code signature database containing signatures of malicious code; and a computer system. The computer system comprises an intercept module configured to detect a launching of a trusted process from a trusted executable file executing on a computer system, detect access to a suspicious address within a suspicious memory area in an address space of the trusted process, wherein the suspicious memory area is a memory area that lies outside the boundaries of a trusted executable image representing the trusted executable file and is an executable memory area, analyze one or more memory areas within a vicinity of the suspicious address space in the computer system to determine whether another executable image representing another executable file is located in the one or more memory areas and a security module configured to determine that malicious code is contained in the address space of the process when the another executable image contains malicious code and perform one of remove, halt or quarantine the malicious code from the address space of the trusted process.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
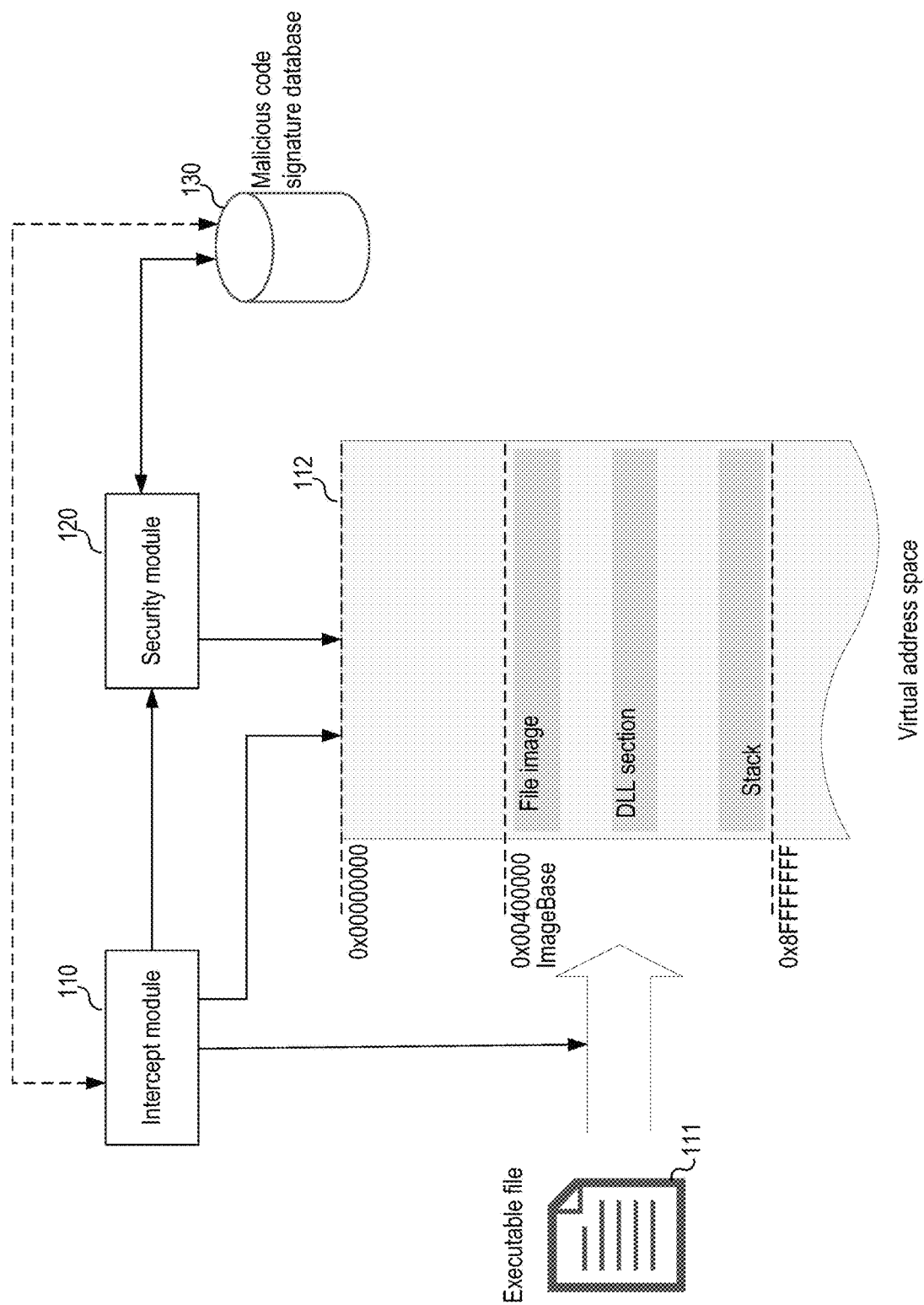
FIG. 1 is a block diagrams of a system of detection of malicious code in the address space of processes according to an exemplary aspect of the present disclosure.

Exemplary aspects are described herein in the context of a system, method, and computer program product for systems and methods for detecting malicious code in the address space of processes. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used throughout the disclosure, drawings and claims.

A malicious application is an application able to cause harm to a computer or to the data stored on the computer. Examples of a malicious application include an Internet worm, a keyboard tracker, a computer virus and the like. The harm caused may be unlawful access to the resources of the computer, including the data being kept on the computer, for the purpose of theft, as well as unlawful use of the resources, including for unauthorized storage of data, performing unauthorized actions and computations, and so on.

A trusted application is an application which does not cause harm to a computer or to its user. A trusted application can be taken to mean an application which has been developed by a trusted software manufacturer, downloaded from a trusted source (such as a site listed in a database of trusted sites), or an application whose identifier (e.g., the MD5 of the application file) is kept in a database of trusted applications. The identifier of the manufacturer, such as a digital certificate, may also be kept in the database of trusted applications.

An untrusted application is an application which is not trusted, but also not recognized as harmful, for example, with the aid of an antivirus application. An untrusted application may afterwards be recognized as harmful, for example, with the aid of an antivirus scan.

A malicious file is a file which is a component of a malicious application and which contains program code (executable or interpretable code).

An untrusted file is a file which is a component of an untrusted application and which contains program code (executable or interpretable code).

A trusted file is a file which is a component of a trusted application.

Signature analysis is a technology of finding correspondences between a particular segment of program code and a known code—signature—from a database of signatures of malicious programs with the goal of detecting a malicious program. It should be noted that this technology can be used both to detect files of a malicious program and to detect malicious code in the random access memory (RAM) of a computing device (alternatively referred to as a computer system).

An antivirus record is information needed by the antivirus application to detect malicious code, and in particular malicious files. It may be, for example, in the form of a signature, a heuristic rule (which can be used, for example, by heuristic and proactive analysis), a check sum or hash of a file (including a flexible or locality sensitive hash—a file hash which is inexamplary to minor file changes).

A script is a sequence of commands (instructions), generally written in high-level programming language, or script language, which can be performed (executed) by a computer system with the aid of a script interpreter.

According to one aspect, a system for detecting malicious code in the address space of processes may be implemented as real-world devices, systems, components and groups of components realized with the use of hardware such as integrated microcircuits (application-specific integrated circuit, ASIC) or field-programmable gate arrays (FPGA) or, for example, in the form of a combination of software and hardware such as a microprocessor system and set of program instructions, and also on neurosynaptic chips. The functionality of such system modules may be realized solely by hardware, and also in the form of a combination, where some of the functionality of the system modules is realized by software, and some by hardware. In certain aspects, some of the modules or all of the modules may be executed on the processor of a general-purpose computer (such as the one shown in FIG. 3). The system components may be realized either within a single computing device or spread out among several interconnected computing devices.

FIG. 1 is a block diagrams of a system of detection of malicious code in the address space of processes according to an exemplary aspect of the present disclosure. The system contains the following components: an intercept module 110, a security module 120 and a malicious code signature database 130. The connections between the elements of the system are likewise designated in FIG. 1. In one examplary aspect of the disclosure, the intercept module 110 and the security module 120 are realized as a single means performing the functions of both the intercept module 110 and the security module 120.

According to one aspect, the executable file 111 is executing on an Operating System (OS) controlling a computer system, in particular by which components of the system are realized. the intercept module 110 may detect the launching of a process from an executable file 111. Upon launching the process from the executable file 111, the operating system (OS) forms a virtual address space 112 (hereafter, simply "address space") of the process, in which the image of the executable file 111 is found. Those of ordinary skill in the art will recognize that the terms "memory area of the address space" and "memory area in the address space" are identical and used interchangeably in this disclosure.

The image (the image, alternatively referred to as the executable image) of the executable file 111 is a representation of the executable file 111 in the address space of the process. The executable image is sufficient to execute the code of the executable file 111 unlike a merely copied byte representation of the executable file 111. In some aspects, the image of the executable file may be formed by the loader of the OS, for example, upon launching the process from the executable file. The executable image generally differs from the executable file itself, for example, by changes which have been made to the addresses (for example, addresses of the procedures and jumps which are called) which are used in the code of the executable image. In order to carry out the process of detecting the launching of a process, the intercept module 110 may contain a driver which intercepts the function that launches the process. In one examplary aspect of the disclosuredisclosure, the Windows OS CreateProcess function launches a process. As a result of detecting the launching of the process, the module 110 determines the unique identifier of the process. In one examplary aspect of the disclosuredisclosure, such an identifier is the structure "PROCESS_INFORMATION", whose fields in particular are assigned values upon calling up the CreateProcess function. In yet another examplary aspect of the disclosure, this identifier may the process description (process handle) or the process identifier (PID). In one examplary aspect of the disclosure, the process identifier may then used by the resources of the system to access the process launched from the file 111. In one aspect, the system accesses the process by accessing the address space 112.

The intercept module 110 may also detect access to a suspicious memory address in the virtual address space 112, carried out during the execution of the process. A memory address is considered suspicious, in one aspect of the disclosure, if that memory address belongs to a suspicious memory area in the address space of the process. According to one aspect, a suspicious memory area is a memory area which lies outside the bounds of the images of executable files in that address space and at the same time is an executable memory area. A memory area is considered suspicious when the memory area contains executable code, where normally executable code is not found in the memory area, or code from these memory areas are not executed. A plurality of images of executable files may be loaded into the address space 112. In some particular examples, the plurality of images comprises an image of the executable file 111 and also other images of executable files, such as the images of dynamic libraries (which are generally found in a dynamically loaded library (DLL) section of the address space 112 which is reserved for dynamic libraries) or other executable files. The suspicious memory areas may be determined, for example, with the aid of a call of the "VirtualQueryEx" function, which returns the pointer to the data structure "MEMORY_BASIC_INFORMATION." One of the fields of "MEMORY_BASIC_INFORMATION" is "Type" takes on the value MEM_IMAGE for the aforementioned memory areas. Accordingly, in some aspects, the VirtualQueryEx function call may also be used to determine that a certain memory address belongs to an executable memory area, but does not belong to the memory area loaded from the executable file. In one exemplary aspect, a suspicious memory area is a memory area in the address space 112 which does not include trusted memory areas. In turn, trusted memory areas may be: the vicinity of the image of an executable file 111 in the address space; the vicinity of the image of a known executable file (the hash or any other identifier of such an image may be stored in a database on a remote server), such as a dynamic library; the vicinity of a known address in the address space 112.

The vicinity of an image of an executable file is a memory area whose boundaries are distant from the boundaries of the image of the executable file by certain predetermined distances, such as 512 bytes from the starting address of the image of the executable file in the direction of decreasing addresses and 512 bytes from the end address of the image of the executable file in the direction of increasing addresses. Determining of the vicinity of an address can be performed as described below. In one examplary aspect, the vicinity of the image of an executable file is the memory area corresponding to a region of memory where the aforementioned image of the executable file is found. In order to determine the boundaries of the region, and consequently the boundaries of the memory area which is the vicinity of a certain executable file image, the VirtualQueryEx function may be used. The VirtualQueryEx returns the pointer to the data structure MEMORY_BASIC_INFORMATION that contains information needed to determine the boundaries of the memory region. In one examplary aspect, the memory region is a memory area composed of pages and is allocated in the address space 112 of the process, for example, with the aid of the VirtualAllocEx function call. A known address is an address whose record is found in a database, such as the malicious code signature database 130. The starting and end addresses of known executable files may also be stored in a database, such as the malicious code signature database 130. The address information may be kept in the database 130 by a specialist in the field of computer technology and used by the intercept module 110 to determine which memory areas in the address space 112 are suspicious.

In one exemplary aspect, accessing the memory address is performed by writing a memory address to the stack. In this case, the intercept module 110 detects whether the memory address has been accessed by checking whether the memory address is present on the stack (in the memory area in the address space 112 reserved for the stack). If the memory address is present on the stack, then during the execution of the process the stack was accessed. In particular, the memory address was written to the stack. In one examplary aspect of the disclosure, the intercept module 110 performs a search for the address on the stack by the CaptureStackBackTrace function call, which returns, as the output parameter BackTrace array (more precisely, the array pointer), the values (pointers, in other words addresses) located on the stack. Accordingly, it is considered that access was had to the memory addresses obtained by the aforementioned function call.

In yet another aspect, the intercept module 110 performs a search for an address on the stack by invoking the NtQueryInformationThread function call, with which it is possible to obtain access to information on the Thread Environment Block (TEB). Calling "NtQueryInformationThread" writes values into the fields of the structure "ThreadInformation", whose format is characterized by the parameter of the ThreadInformationClass call (such as ThreadBasicInformation). The ThreadInformationClass contains the addresses in the memory within whose boundaries the stack is located (for the thread calling up the function). Having thread information along with information about the values of the processor registers (at least the registers esp and ebp), the intercept module 110 may detect the memory addresses on the stack (in one example, specifically, the chain of calls analogous to that which can be obtained by using CaptureStackBackTrace).

In one examplary aspect, the address on the stack is considered to be a number located on the stack and whose value lies in the range of 0x00000000 to 0x8FFFFFFF. In yet another examply aspect, any value located on the stack at an address aligned with a fixed amount (such as 2 bytes) is considered to be the address.

In one examplary aspect of the disclosure, the intercept module 110 is able to perform a search for an address on the stack with a given periodicity, for example, every 5 seconds after launching the process. In yet another examplary aspect of the disclosure, the intercept module 110 is able to perform a search for an address on the stack during certain given events.

In another examplary aspect of the disclosure, accessing the address is performed by the CreateThread function call, which takes the aforementioned address as an argument. In yet another examplary aspect, accessing the address is performed by the CreateProcess function call. In yet another examplary aspect of the disclosure, accessing the address is performed by the WriteFile function call. By the calling of one of the above-indicated functions, the access may be detected by the intercept module 110 with the help of any method known in the prior art, such as with the use of a driver or by establishing a callback procedure (or hook) for the call of the corresponding function, such as CreateThread or CreateProcess.

In one examplary aspect of the disclosure, the executable file 111 is a trusted file, and the components of the system in this case are designed to detect malicious code in the address space 112 of the trusted process. In one examplary aspect of the disclosure, the trusted file 111 is a file of a script interpreter, such as PowerShell. The detection of malicious code in the address space 112 of PowerShell is necessary, because PowerShell scripts, by using the abilities provided by the interpreter, are able to download executable files (which may be malicious), save these files in a memory area in the address space 112 specially set aside for this (and without saving the files on a storage device of the computer system, such as a hard disk), and execute all the function of the OS loader (sometimes also called the "executable file loader", being part of the OS). Therefore in Powershell, the executable file loaded into the memory can be converted into an executable file image available for execution, and control can be transferred to the executable code from the downloaded file. Thus, it is possible to carry out an attack on the computer system using "fileless" malware where the malicious executable file is downloaded into the RAM in the address space 112 of the trusted process without being saved on the data storage device of the computer system, making it difficult to detect the malicious code with the approaches known in the prior art.

The security module 120 is connected to the intercept module 110 and the malicious code signature database 130. The security module 120 is designed to analyze a memory area in the address space 112 of a process. The goal of this analysis is to detect in the address space 112, especially in the mentioned memory area, executable file images. In one examplary aspect of the disclosure, the security module 120 is able to detect executable file images in the vicinity of a certain memory address, in one particular aspect of the disclosure this memory address being a suspicious memory address. The vicinity of the memory address is a memory area whose boundaries are distant from the memory address by certain distances, such as 64 kbytes from the address in the direction of decreasing addresses and 64 kbytes in the direction of increasing addresses. Thus, an example of the vicinity of the address 0x00600000 will be a memory area in the address space 112 situated between the addresses 0x005FFE00 and 0x00610000 in the address space 112 of the process. In another aspect, the vicinity of the memory address is a memory area corresponding to a memory region (being this region) in which said memory address is found. In order to determine the boundaries of the region and, consequently, the boundaries of the memory area which is the vicinity of a certain memory address, one may use the VirtualQueryEx function, which returns the pointer to the data structure MEMORY_BASIC_INFORMATION, containing information necessary to determine the boundaries of a memory region. In one examplary aspect of the disclosure, the security module 120 detects an executable file image in the memory area (for example, in the vicinity of a certain address) if the following condition is fulfilled: the memory area contains the header of the executable file, specifically for example for executable files of the Windows OS, the memory area contains the header of an executable file if it contains a sequence of bytes which in symbolic form looks like "MZ", whereby from the start of this string at a distance of 0x3C there is found in the memory a sequence of four bytes (DWORD), the adding of whose value to the address of the start of the string "MZ" produces the address in the memory at which the sequence of bytes is found, appearing in symbolic form as "PE".

It should be noted that any other known approaches of the prior art may be used to detect the executable file image in the address space 112, especially those based on detecting the header or a portion thereof in the memory area PE, and also any other methods.

In one examplary aspect, upon detecting an executable file image in the memory area, or in the address space 112 as a whole, the security module 120 also determines the start address of the image of the detected executable file.

The security module 120 is also able to detect malicious code in the address space 112 of a process. The detecting of malicious code by the security module 120 occurs in the address space 112, especially in detected images of executable files which are present in the address space 112. In one examplary aspect, the security module detects not simply the fact of the presence of malicious code in the address space 112, but also detects precisely how the executable file image contains malicious code (i.e., it detects the image of the malicious executable file). Upon detecting the image of a malicious executable file in the address space 112, the security module 120 is able to remove data from the memory pertaining to that malicious file image, especially data situated in the memory area whose start was previously determined as being the address of the start of the detected malicious file image. Thus, the security of the computer system can be assured by removing malicious code from the address space 112 of the process, especially the image of the malicious executable file (specifically, the data of the image).

In the course of the process of detecting malicious code, one may use, for example, signature, heuristic, or any other kind of analysis. For the detection of malicious code, the security module 120 uses antivirus records which are kept in the malicious code signature database 130.

The malicious code signature database 130 saves antivirus records which are used by the security module 120 for the detection of malicious code. In one examplary aspect of the disclosure, these records are signatures.

Figure 2:
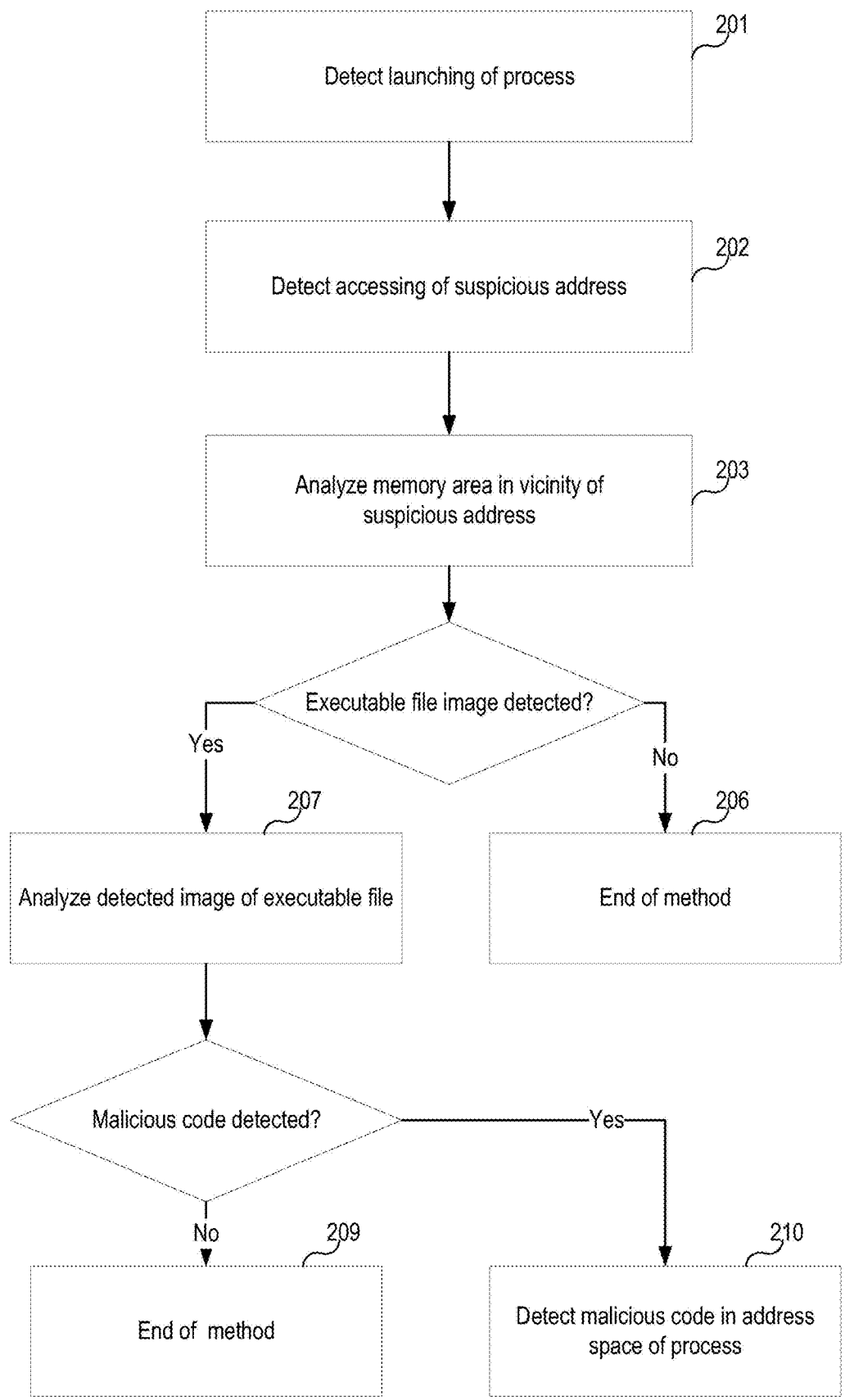
FIG. 2 is a flowchart illustrating a method for detection of malicious code in the address space of processes according to an exemplary aspect of the present disclosure.

FIG. 2 is a flowchart illustrating a method for detection of malicious code in the address space of processes according to an exemplary aspect of the present disclosure. Examplary In step 201 the intercept module 110 is used to detect the launching of a process from an executable file 111, whereby the address space 112 is formed upon creating the process in the RAM of the computer system (generally by the OS components, such as the OS loader). In one examplary aspect of the disclosure, the executable file 111 is a trusted executable file. In one examplary aspect of the disclosure, the trusted executable file 111 is an executable file of a script interpreter, such as PowerShell. After detecting the launching of the process from the executable file 111, the intercept module 110 in step 202 detects the accessing of a suspicious address within the address space 112 during the execution of the process launched from the executable file 111, by one of the above-described methods. Having detected access to a suspicious address, the intercept module 110 sends to the security module 120 a notification as to the detecting of access to a suspicious address, along with an indication of which address in the memory is suspicious. After this, in step 203, the security module 120 performs an analysis of the memory area in the address space 112 in the vicinity of at least one suspicious address, the accessing of which was previously detected during the execution of the process launched from the executable file 111. The goal of this analysis is to detect in the address space 112, particularly in memory areas in the vicinities of suspicious addresses, the images of executable files which were downloaded from other executable files (not necessarily present on the data storage device of the computer system, but present in the RAM). In other words, the security module 120 performs an analysis to determine whether files, other than the file 111, have an image present in the address space 112. Such images of other files may be loaded into the address space 112 during the execution of the process, for example, if the process is launched from the executable file of the script interpreter PowerShell, where a script (sometimes known as a "script file") transferred to the process is processed, for example, as a parameter of a command line or in another way. In keeping with that script (by interpreting the instructions of that script) the process of the script interpreter loads a file from the network (the "other" file mentioned above) and forms its image in the address space 112. If no images of executable files loaded from other executable files are detected, then in step 206 the method of detection of malicious code in the address space of processes is terminated. But if at least one executable file image is detected, then in step 207 the security module 120 analyzes the detected image of the executable file in order to detect malicious code in the address space 112, especially in the memory area where that executable file image was downloaded. If no malicious code is detected, the operation of the method is concluded in step 209. Otherwise, in step 210 the security module 120 detects malicious code in the address space 112 of the process launched from the file 111.

It should be noted that the above-described method makes it possible to reduce the consumption of resources of the computer system used in providing security, since the prototypes known from the prior art in particular call for a searching for malicious code in memory areas with the aid of signatures regardless of the location of the memory areas being analyzed. In the proposed method, the step of detecting malicious code is preceded by the step of detecting access to a suspicious address belonging to a memory area in which an executable file image may be located which may potentially contain malicious code. The step of detecting malicious code in a memory area (particularly the image of a malicious executable file) is performed only after detecting such an accessing. Accordingly, when executing the process, the analysis of its address space 112 in order to detect malicious code is done only in certain cases, which reduces the consumption of resources of the computer system on which the means of the system of detection of malicious code in the address space of processes are running.

In one examplary aspect of the disclosure, after detecting malicious code in the address space 112 of a process launched from an executable file 111, the security module 120 is able to halt the execution of the process in whose address space 112 the malicious code was found. Thus, the security module 120 prevents the execution of malicious code and, accordingly, provides security to the computer system in which the components of the present disclosure or system are functioning, and in which the process launched from the executable file 111 is being executed.

In yet another examplary aspect, the security module 120 saves information about the URI (Universal Resource Identifier, especially the URL, or network address), from which at least one detected image of another executable file was downloaded (we shall call this URI the "dangerous URI"), with the aid of a network driver which is part of the security module 120, and sends this information on the dangerous URI, especially the symbolic representation of the URI or the hash calculated from the symbolic representation of that URI, to a remote security server (not shown in the figures). Afterwards, this information (which may be saved either locally in the computer system or on the remote security server) about dangerous URIs from which other executable files were downloaded can be used by the security module 120 situated on the computer system, and also by a similar security module 120 deployed on other computer devices (which may obtain information about the URI from the remote security server), for the blocking of connections which are established by certain processes with these dangerous URIs. Thus, security is assured to the computer system on which the security module 120 is functioning, which does not allow processes being executed on that computer system to establish connections with, or also download data from, dangerous URIs, especially executable files.

In yet another examplary aspect, the security module 120 recognizes the script downloaded by a script interpreter such as PowerShell, as being malicious after malicious code is detected in the address space 112 of the process, because the execution of interpreter commands resulted in the appearance of malicious code in the address space of the process launched from the trusted file.

Processing (interpreting or executing) of a script in the context of the present disclosure refers to the execution of script commands (instructions) with the aid of a script interpreter, for example PowerShell. Information as to the execution of precisely which script led to the detection of malicious code may be obtained by the intercept module 110, for example from the arguments of the command line launching the process from the executable file 111. In yet another examplary aspect of the disclosure, this information may be obtained by intercepting a system message corresponding to the opening of a script with the Drag-and-Drop technique (message WM_DROPFILES), or a system message as to the transfer of data WM_COPYDATA.

In yet another examplary aspect, information as to the execution of precisely which script led to the detection of malicious code may be obtained by intercepting the Create-File function call, which is performed during the execution of the process launched from the executable file 111. In yet another aspect, any of the known approaches of the prior art may be used to determine the script in whose address space 112 malicious code was detected upon its execution. The aforementioned scheme for recognizing a script as malicious is also valid for scripts which were downloaded after the execution of scripts recognized as being malicious. Thus, the security module 120 detects that a script is malicious (in other words, recognizes that script as being malicious) when instructions executed by the script interpreter during the execution of the process launched from the file of the script interpreter occurred prior to the moment of detecting malicious code in the address space 112 of that process.

In one examplary aspect of the disclosure, the security module 120 removes the script recognized as being malicious, or places it in quarantine, thereby providing security to the computer system within which the security module 120 is operating. In yet another examplary aspect of the disclosure, the security module 120 transmits the identifier of the script recognized as being malicious (for example, the check sum, especially MD5 or some other kind of hash) to a remote security server. Such an identifier of a script recognized as being malicious may be used by the security module 120 located on the computer system, and also by similar means 120 deployed on other computer devices, to detect malicious scripts on the computer devices on which the security module 120 is present.

The above-described examplary aspect of the disclosure may be explained as follows. On computer system A, a malicious script X has been detected in accordance with the above-described method of detection of malicious code in the address space 112 of processes. The identifier of this script is sent by the security module 120 located on computer system A to a remote security server. In one examplary aspect of the disclosure, the identifiers of such malicious scripts are kept in a database of identifiers of malicious scripts, provided for this purpose and located on the remote security server. On computer system B there is also located a security module 120, which can check scripts, for example those downloaded from a network, both upon completion of the downloading from the network and upon launching the downloaded script with the use of a script interpreter. If in some way the script X appears on computer system B, then upon launching it the security module 120 located on computer system B will detect the malicious script X by using information about malicious scripts provided by the remote security server. Identifiers which are kept on the remote security server of malicious scripts can be downloaded by the security module 120 located on computer system B into a local storage for further use, especially for detecting of malicious scripts. Thus, the security module 120 located on computer system B will detect a malicious script located on computer system B. After this detection, script X may be removed by the security module 120 or placed in quarantine, thus ensuring the safety of computer system B.

Figure 3:
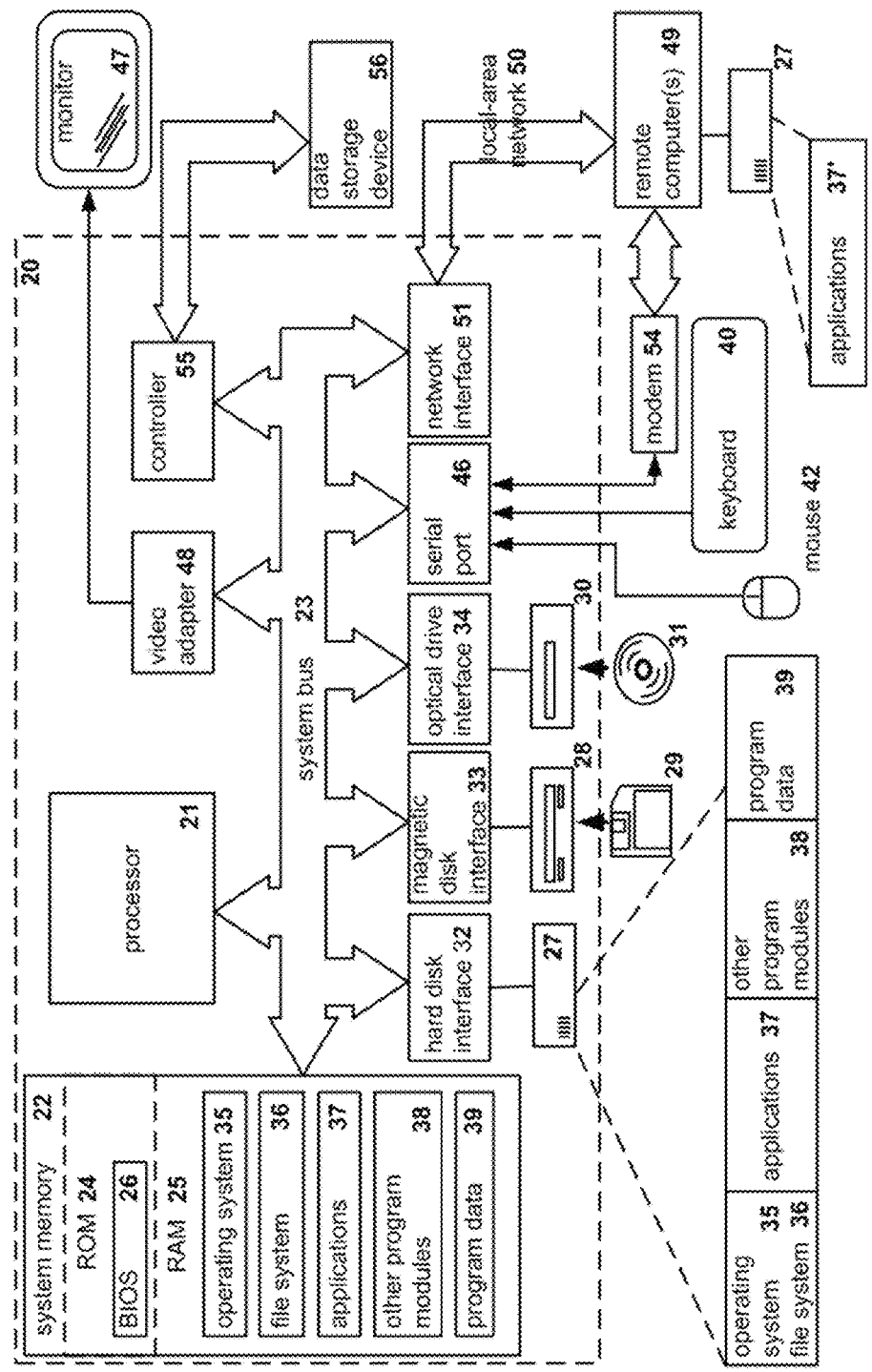
FIG. 3 presents an example of a general-purpose computer system according to an exemplary aspect of the present disclosure.

FIG. 3 presents an example of a general-purpose computer system 20 on which aspects of systems and methods for detecting malicious code in the address space of processes may be implemented in accordance with an exemplary aspect. It should be noted that the computer system 20 can correspond to the system 100 or the modules therein as described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malicious code in an address space of a process comprising:
   detecting a launching of a trusted process from a trusted executable file executing on a computer system;
   detecting access to a suspicious address within a suspicious memory area in an address space of the trusted process, wherein the suspicious memory area is a memory area that lies outside the boundaries of a trusted executable image representing the trusted executable file and is an executable memory area;
   analyzing one or more memory areas within a vicinity of the suspicious address space in the computer system to determine whether another executable image representing another executable file is located in the one or more memory areas;
   analyzing the another executable image to determine whether the another executable image contains malicious code;
   concluding malicious code is contained in the address space of the trusted process when the another executable image contains malicious code; and
   performing one of removing, halting or quarantining the malicious code from the address space of the trusted process.

2. The method of claim 1, wherein detecting the launching comprises:
   intercepting a function that launches the process;
   determining identifying information for the process; and
   determining and accessing the address space associated with suspicious activity based on the identifying information.

3. The method of claim 1, further comprising:
   concluding the one or more memory areas to be suspicious when the one or more memory areas do not contain trusted areas.

4. The method of claim 3, wherein the trusted areas comprise one or more of:
   a vicinity of the executable image in the address space;
   a vicinity of an image of a known executable file; and
   a vicinity of a known address in the address space.

5. The method of claim 4, wherein the vicinity is within a first predetermined number of bytes from a starting address of the executable image and a second predetermined number of bytes from an end address of the executable image.

6. The method of claim 4, further comprising:
determining boundaries of a vicinity of the executable image by querying for page information regarding the memory areas.

7. The method of claim 1, wherein detecting access to the address space comprises:
detecting whether a memory address in the address space is present in a memory area reserved for a stack of the trusted process.

8. The method of claim 7, further comprising:
searching for an address on the stack using a function call to access information regarding a thread on which the process is executing.

9. The method of claim 1, wherein access to the address space comprises: calling one or more of the functions: "CreateThread", "CreateProcess" and "WriteFile".

10. The method of claim 9, wherein detecting the access comprises:
establishing a callback procedure for calling each of the one or more functions.

11. A system for detecting malicious code comprising:
a malicious code signature database containing signatures of malicious code; and
a computer system comprising:
an intercept module configured to:
detect a launching of a trusted process from a trusted executable file executing on a computer system;
detect access to a suspicious address within a suspicious memory area in an address space of the trusted process, wherein the suspicious memory area is a memory area that lies outside the boundaries of a trusted executable image representing the trusted executable file and is an executable memory area;
analyze one or more memory areas within a vicinity of the suspicious address space in the computer system to determine whether another executable image representing another executable file is located in the one or more memory areas; and
a security module configured to:
determine that malicious code is contained in the address space of the process when the another executable image contains malicious code; and
perform one of remove, halt or quarantine the malicious code from the address space of the trusted process.

12. The system of claim 11, wherein the intercept module is configured to detect the launching by:
intercepting a function that launches the process;
determining identifying information for the process; and
determining and accessing the address space associated with suspicious activity based on the identifying information.

13. The system of claim 11, wherein the security module is further configured to:
conclude that the one or more memory areas are suspicious when the one or more memory areas do not contain trusted areas.

14. The system of claim 13, wherein the trusted areas comprise one or more of:
a vicinity of the executable image in the address space;
a vicinity of an image of a known executable file; and
a vicinity of a known address in the address space.

15. The system of claim 14, wherein the vicinity is within a first predetermined number of bytes from a starting address of the executable image and a second predetermined number of bytes from an end address of the executable image.

16. The system of claim 14, wherein the intercept module is further configured to:
determine boundaries of a vicinity of the executable image by querying for page information regarding the memory areas.

17. The system of claim 11, wherein the the intercept module is configured to detect access to the address space by:
detecting whether a memory address in the address space is present in a memory area reserved for a stack of the trusted process.

18. The system of claim 17, wherein the intercept module is further configured to:
search for an address on the stack by using a function call to access information regarding a thread on which the process is executing.

19. The system of claim 11, wherein access to the address space comprises: calling one or more of the functions: "CreateThread", "CreateProcess" and "WriteFile".

20. The system of claim 19, further comprising:
detecting the access to the address space by one or more of: using a driver; and
establishing a callback procedure for calling each of the one or more functions.

21. A non-transitory computer-readable medium, storing thereon instructions that when executed by a processor performs a method for detecting malicious code comprising:
detecting a launching of a trusted process from a trusted executable file executing on a computer system;
detecting access to a suspicious address space within a suspicious memory area in an address space of the trusted process, wherein the suspicious memory area is a memory area that lies outside the boundaries of a trusted executable image representing the trusted executable file and is an executable memory area;
analyzing one or more memory areas within a vicinity of the suspicious address space in the computer system to determine whether another executable image representing another executable file is located in the one or more memory areas;
analyzing the another executable image to determine whether the another executable image contains malicious code;
concluding malicious code is contained in the address space of the trusted process when the another executable image contains malicious code; and
performing one of removing, halting or quarantining the malicious code from the address space of the trusted process.

* * * * *